United States Patent
Son et al.

(10) Patent No.: US 12,250,682 B2
(45) Date of Patent: Mar. 11, 2025

(54) METHOD AND DEVICE FOR ALLOCATING SIDELINK RESOURCE IN COMMUNICATION SYSTEM

(71) Applicants: Hyundai Motor Company, Seoul (KR); Kia Corporation, Seoul (KR)

(72) Inventors: Hyuk Min Son, Jeollabuk-do (KR); Gene Back Hahn, Gyeonggi-do (KR); In yong Jung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 355 days.

(21) Appl. No.: 17/772,376

(22) PCT Filed: Oct. 23, 2020

(86) PCT No.: PCT/KR2020/014548
§ 371 (c)(1),
(2) Date: Apr. 27, 2022

(87) PCT Pub. No.: WO2021/085943
PCT Pub. Date: May 6, 2021

(65) Prior Publication Data
US 2022/0377726 A1    Nov. 24, 2022

Related U.S. Application Data

(60) Provisional application No. 62/927,871, filed on Oct. 30, 2019.

(30) Foreign Application Priority Data

Oct. 12, 2020    (KR) .................. 10-2020-0131309

(51) Int. Cl.
*H04W 72/20*    (2023.01)

(52) U.S. Cl.
CPC .................... *H04W 72/20* (2023.01)

(58) Field of Classification Search
CPC ....... H04W 72/20; H04W 76/14; H04W 4/40; H04W 72/02; H04W 4/70; H04W 72/53; H04W 72/56; H04W 92/18
See application file for complete search history.

(56) References Cited

U.S. PATENT DOCUMENTS

2019/0098617 A1    3/2019  Li et al.
2020/0260472 A1*   8/2020  Ganesan ................. H04W 4/46
(Continued)

FOREIGN PATENT DOCUMENTS

WO       2017/067503 A1      4/2017
WO    WO 2019192701 A1  * 10/2019
WO    WO 2021035466 A1  *  3/2021

OTHER PUBLICATIONS

Spreadtrum Communication, Discussion on physical layer structure for sidelink, R1-1910005, 3GPP TSG RAN WG1 #98bis, Chongqing, China, Oct. 1, 2019.

(Continued)

*Primary Examiner* — Rushil P. Sampat
(74) *Attorney, Agent, or Firm* — Fox Rothschild LLP

(57) ABSTRACT

A method and device are configured to allocate a sidelink resource in a communication system. An operation method of a first terminal includes steps of: generating first stage sidelink control information (SCI) including first resource allocation information and a first indicator indicating whether second stage SCI includes second resource allocation information; transmitting the first state SCI to a second terminal through a physical sidelink control channel (PSCCH); and performing sidelink communication with the second terminal by using a first resource area indicated by the first resource allocation information.

20 Claims, 11 Drawing Sheets

(56) References Cited

U.S. PATENT DOCUMENTS

| | | | |
|---|---|---|---|
| 2021/0067290 A1* | 3/2021 | Chen | H04L 5/0033 |
| 2022/0052822 A1* | 2/2022 | Lin | H04L 5/0094 |
| 2022/0303969 A1* | 9/2022 | Hwang | H04W 72/20 |
| 2024/0129898 A1* | 4/2024 | Ashraf | H04W 72/20 |

OTHER PUBLICATIONS

Samsung, Feature lead summary#2 for agenda item 7.2.4.1 Physical layer structure for sidelink, R1-1911703, 3GPP TSG RAN WG1 #98bis, Chongqing, China, Oct. 22, 2019.

Fraunhofer HHI, Design of NR V2X Physical Layer Structure, R1-1910554, 3GPP TSG RAN WG1 #98bis, Chongqing, China, Oct. 7, 2019.

Huawei, Sidelink physical layer structure for NR V2X, R1-1910054, 3GPP TSG RAN WG1 #98bis, Chongqing, China, Oct. 8, 2019.

R1-1908737, "Two-stage SCI design and adaptive DMRS support for sidelink", 3GPP TSG RAN WG1 Meeting #98, Prague, Czech Republic, Aug. 26-30, 2019, Agenda Item: 7.2.4.1, 6 pages.

R1-1909419, "On physical layer structure for NR V2X sidelink", 3GPP TSG-RAN WG1 Meeting #98, Prague, Czech Republic, Aug. 26-30, 2019, Agenda Item: 7.2.4.1, 5 pages.

R1-1910005, "Discussion on physical layer structure for sidelink", 3GPP TSG RAN WG1 #98bis, Chongqing, China, Oct. 14-20, 2019, Agenda Item: 7.2.4.1, 14 pages.

R1-1906361, "Discussion on physical layer structure for sidelink", Spreadtrum Communications, Agenda item: 7.2.4.1, 3GPP TSG RAN WG1 #97, Reno, USA, May 13-17, 2019, 15 pages.

\* cited by examiner

[FIG. 1]
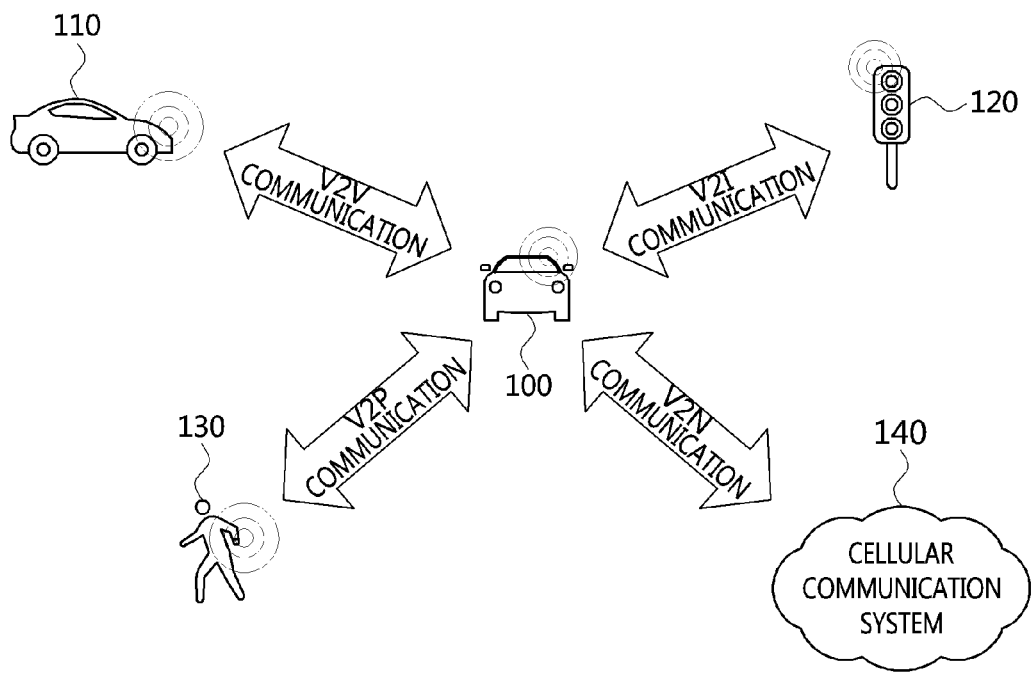

[FIG. 2]
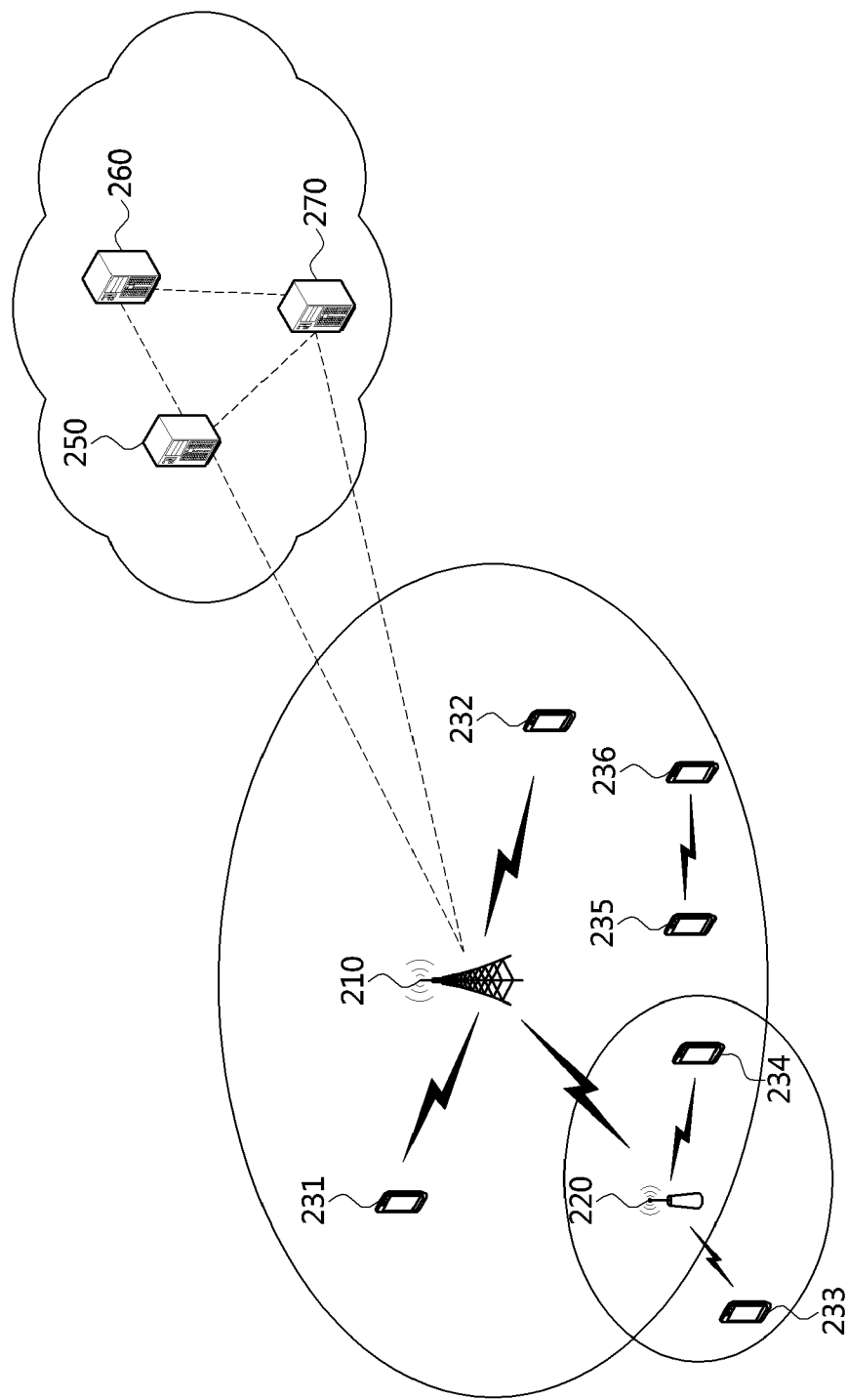

【FIG. 3】
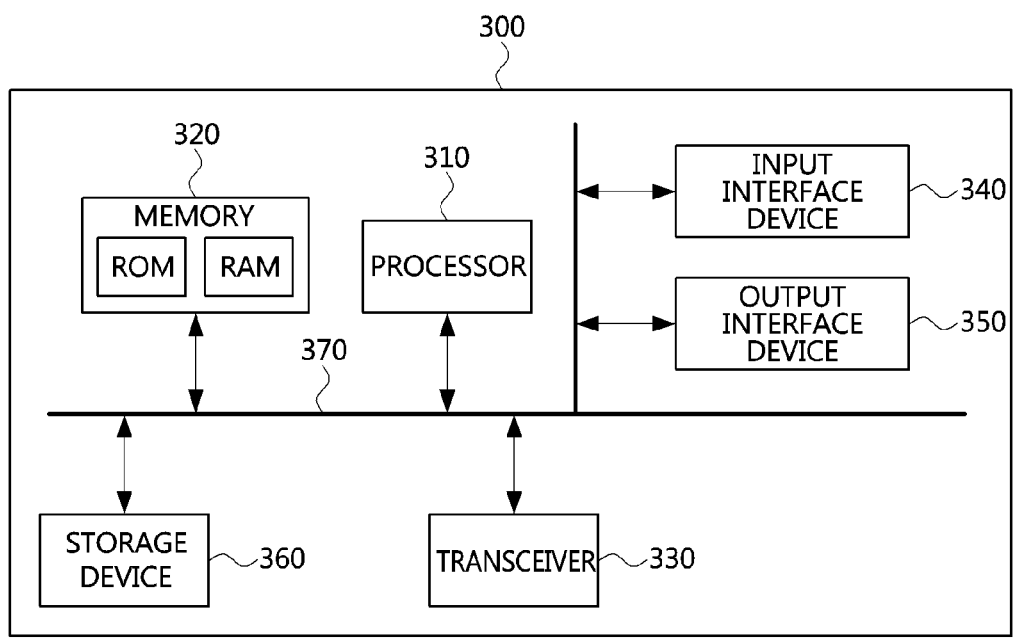
【FIG. 4】
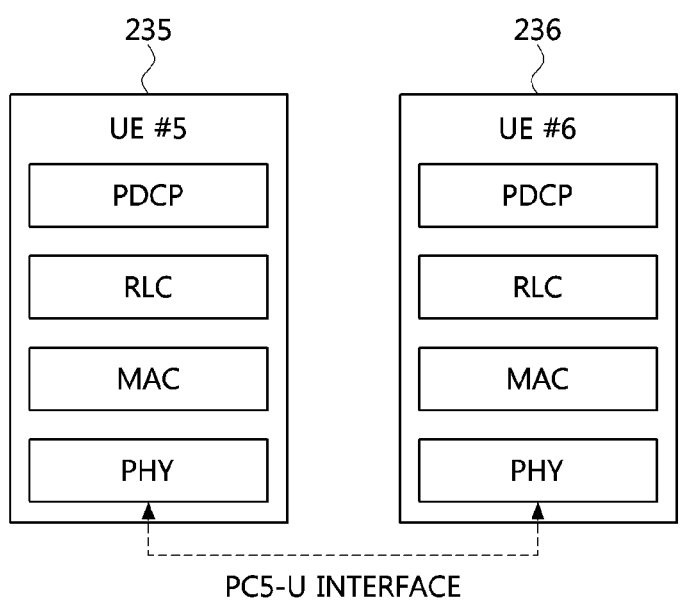

[FIG. 5]
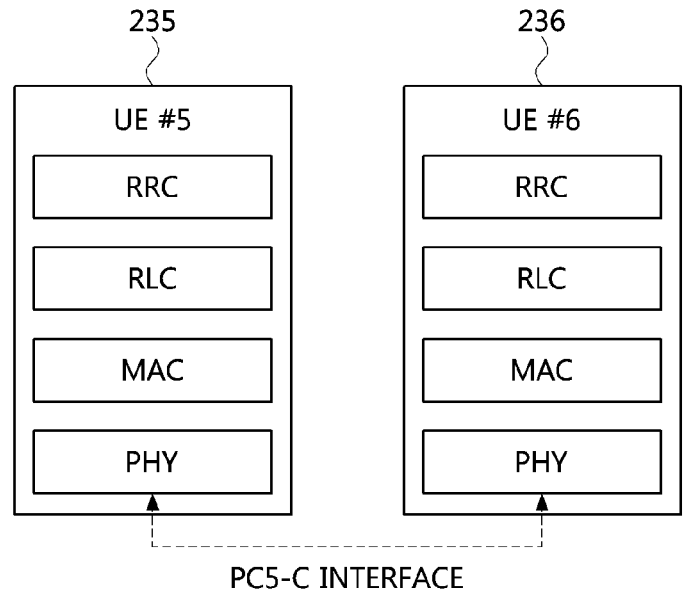
[FIG. 6]
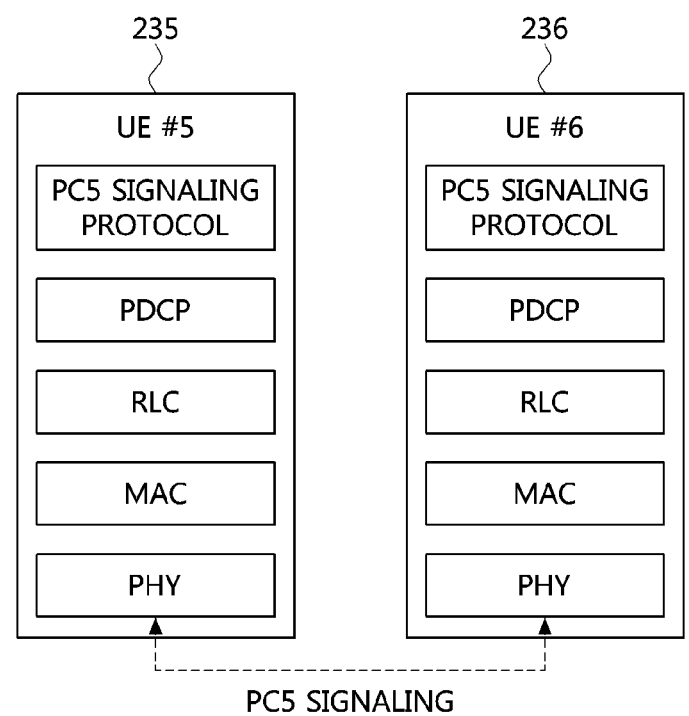

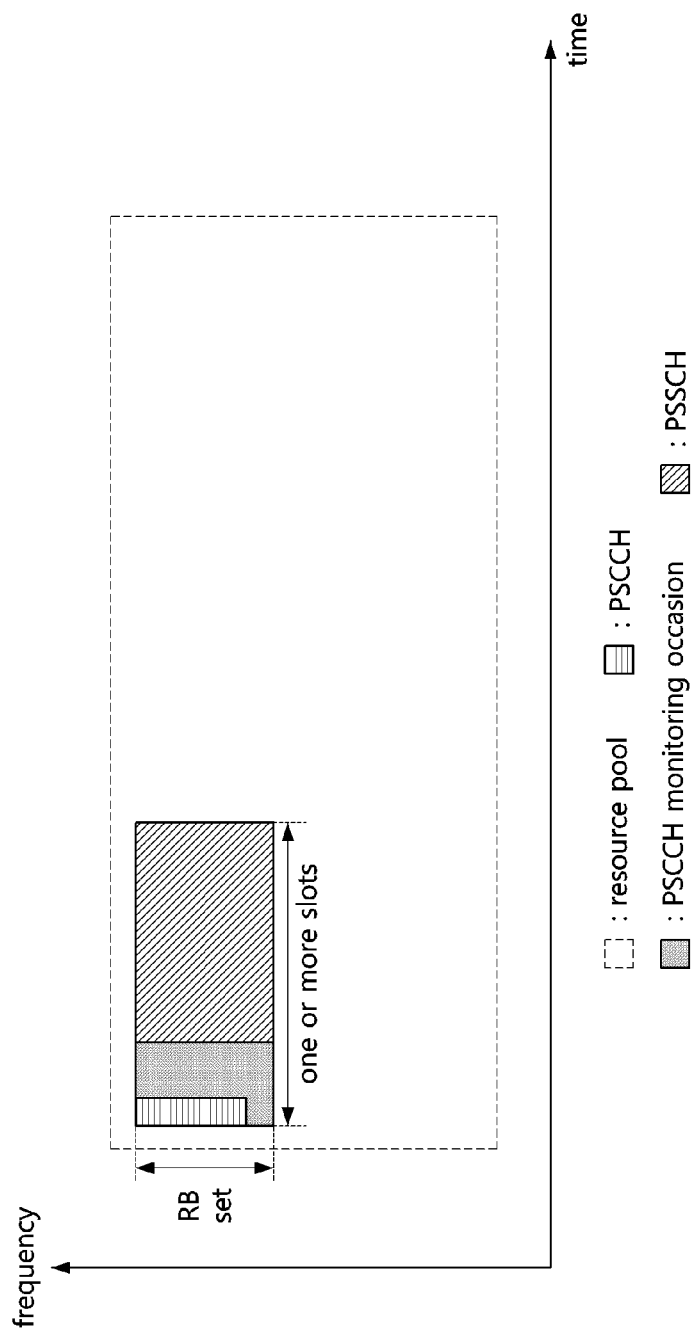
[FIG. 7]

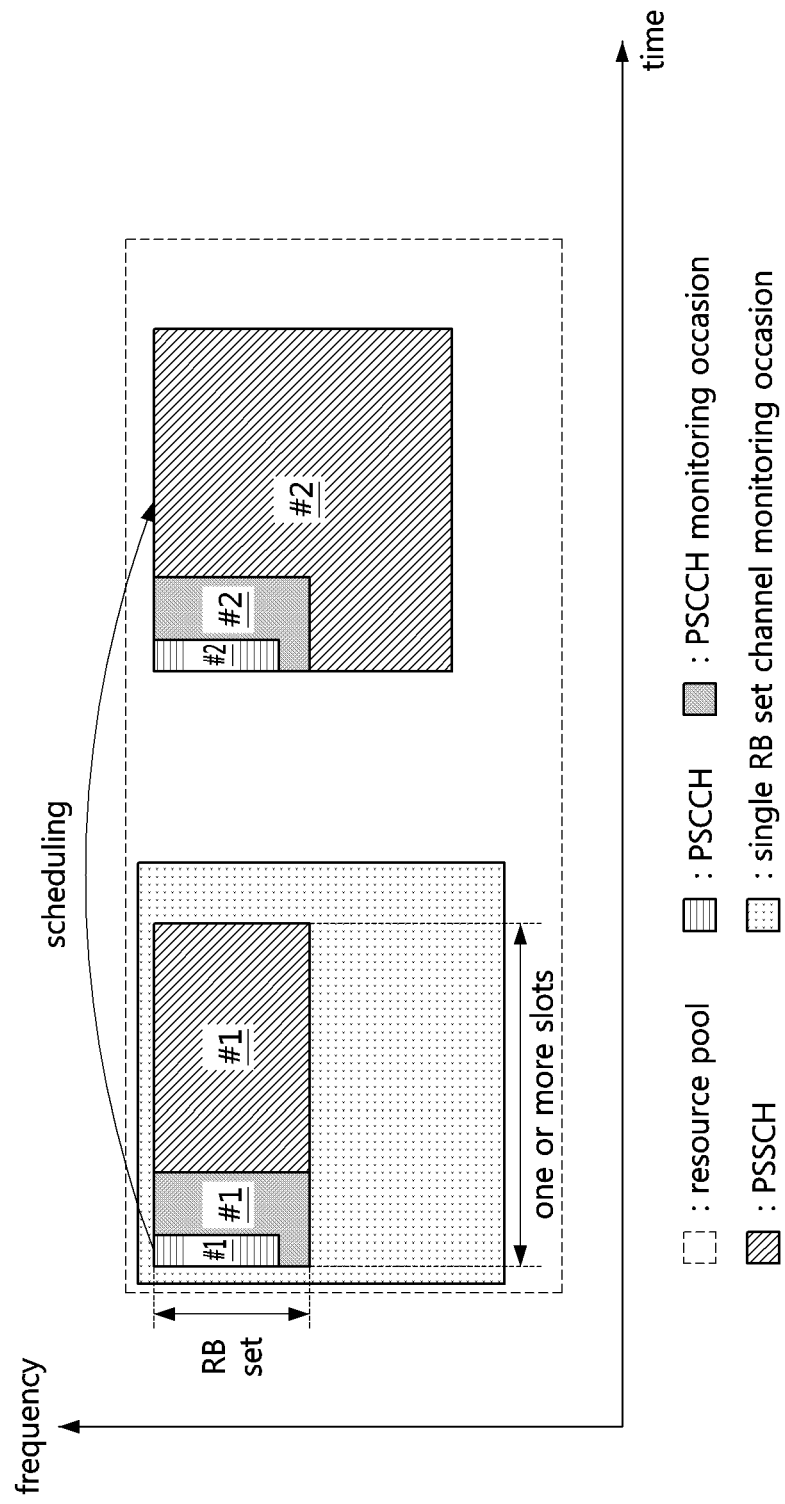
[FIG. 8]

[FIG. 9]
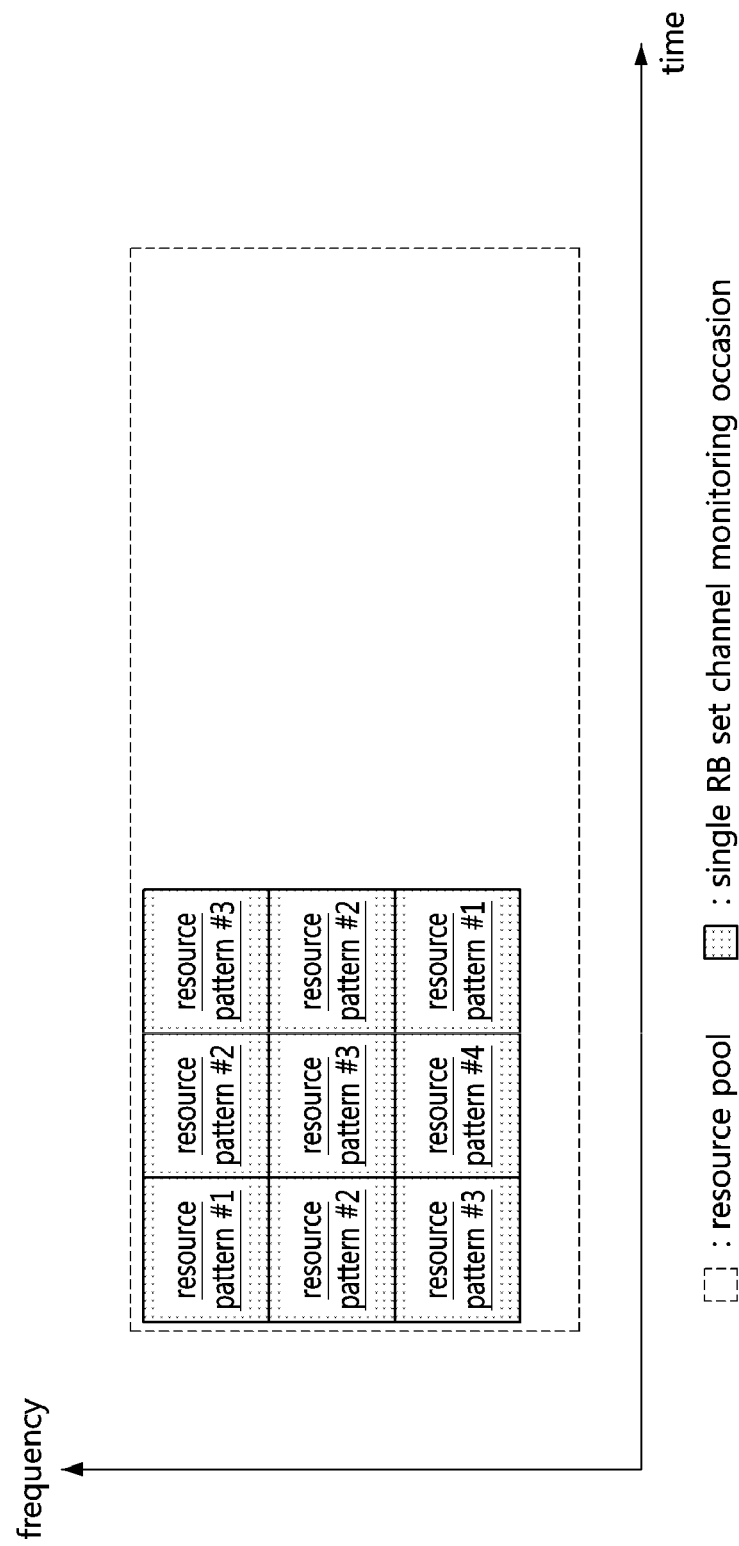

[FIG. 10]
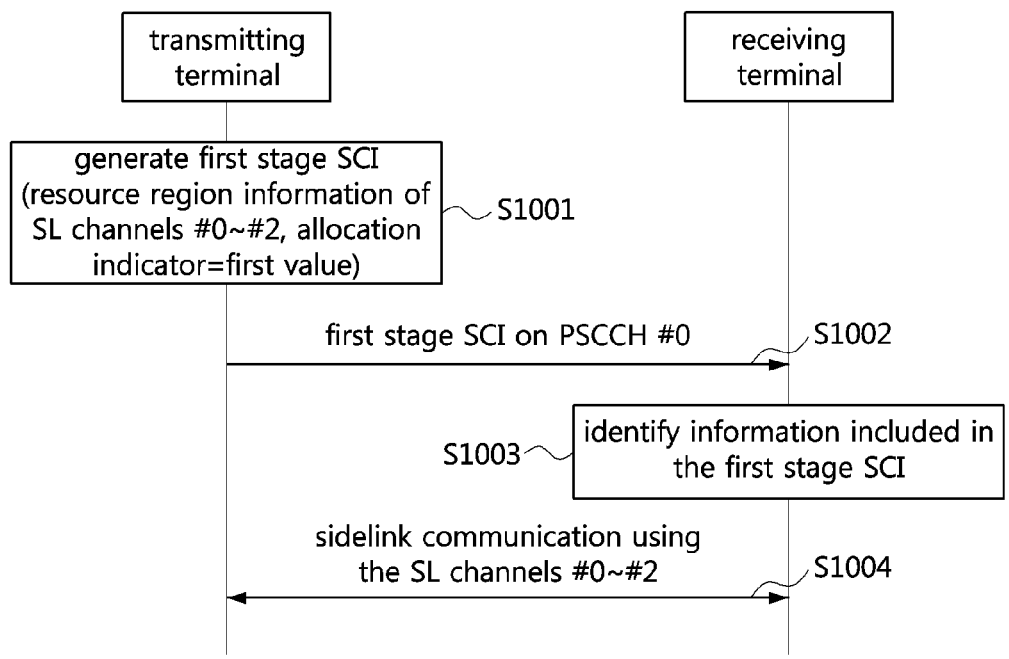

[FIG. 11]
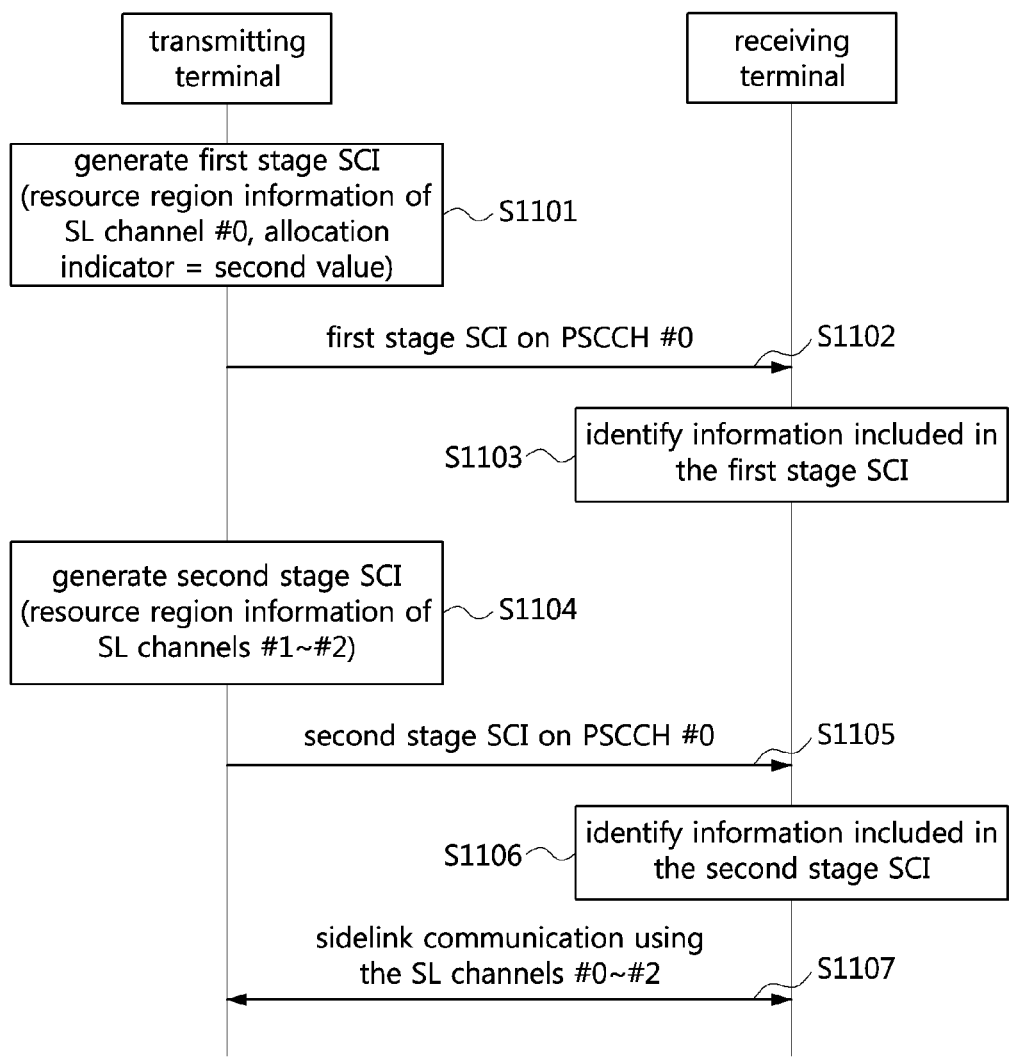

[FIG. 12]
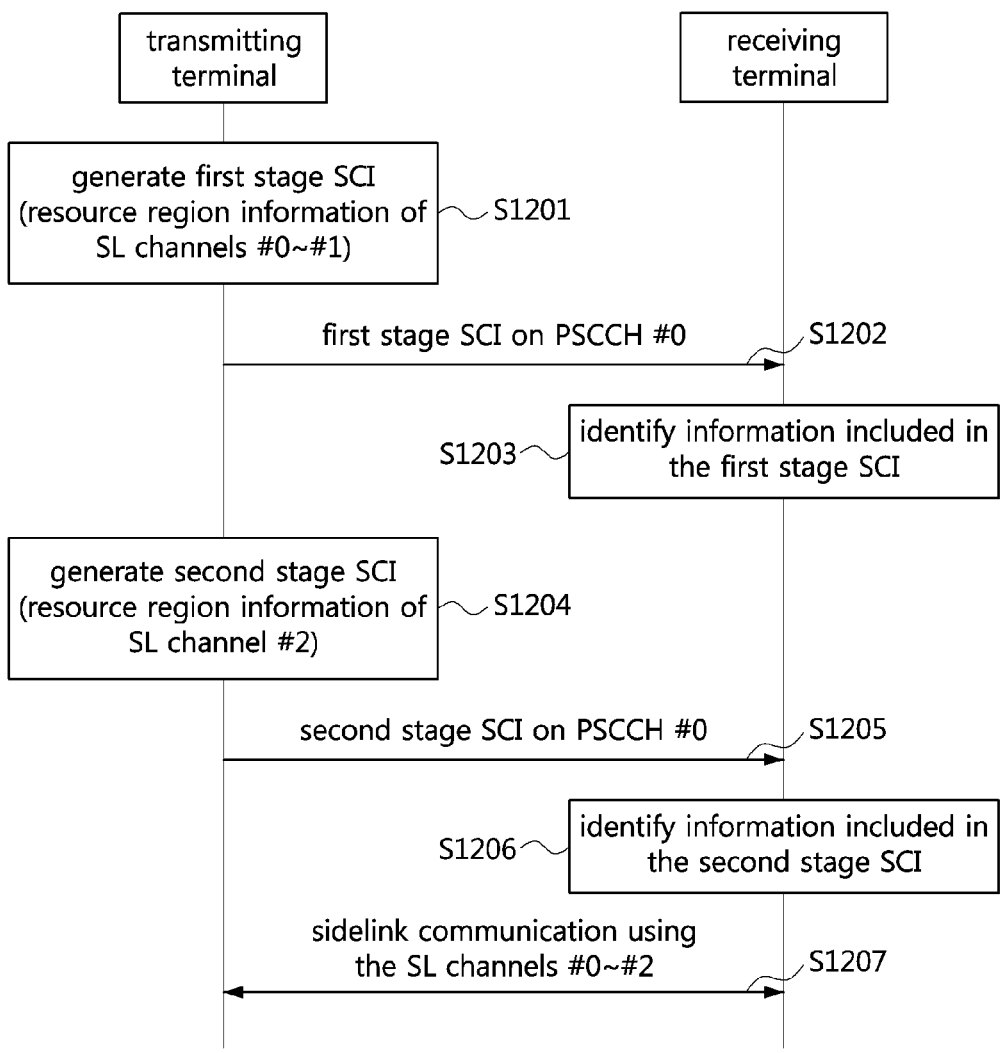

[FIG. 13]
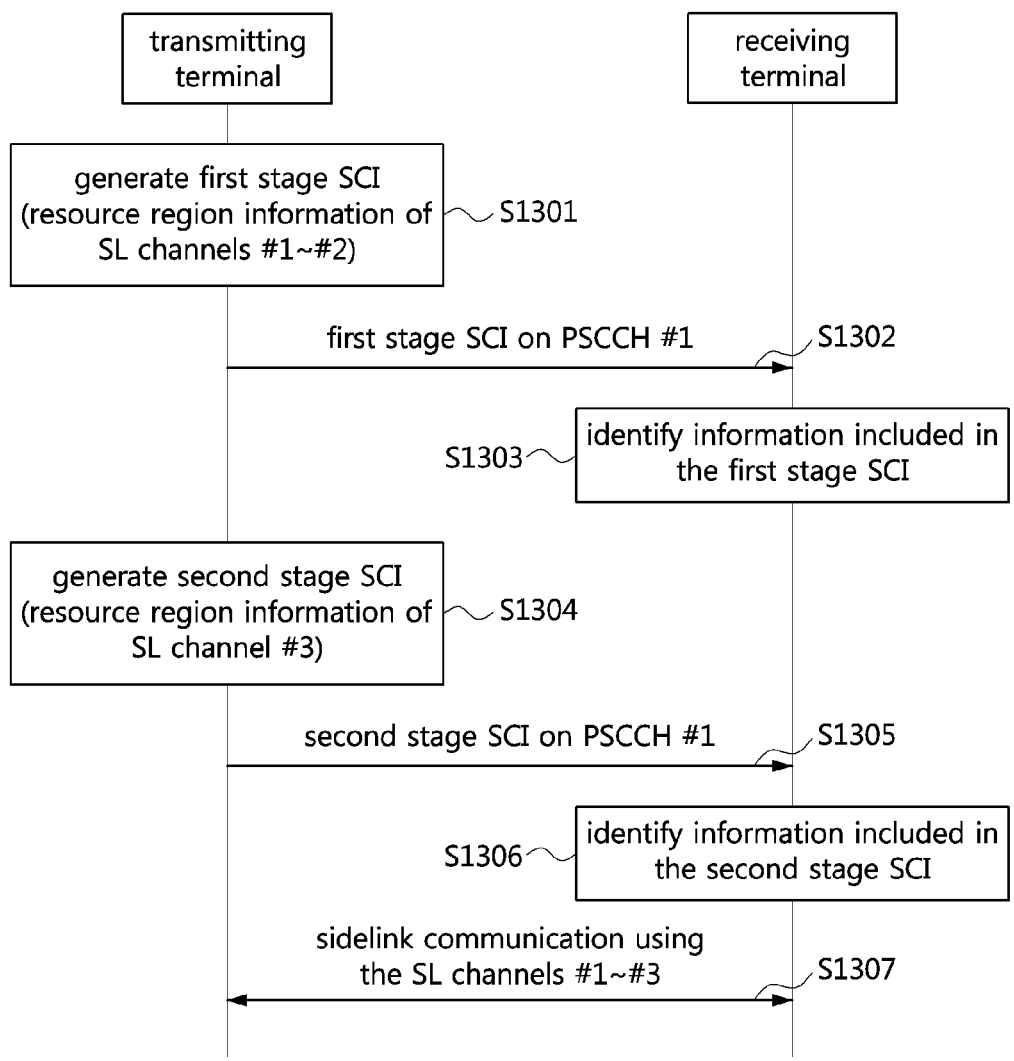

METHOD AND DEVICE FOR ALLOCATING SIDELINK RESOURCE IN COMMUNICATION SYSTEM

CROSS-REFERENCE TO RELATED APPLICATIONS

This application is a National Phase application filed under 35 USC 371 of PCT International Application No. PCT/KR2020/014548 with an International Filing Date of Oct. 23, 2020, which claims priority from U.S. Provisional Application 62/927,871 filed on Oct. 30, 2019 and Korean Application 10-2020-0131309 filed on Oct. 12, 2020. The entire contents of these applications are incorporated herein by reference in their entirety.

1. FIELD

The present disclosure relates to a sidelink communication technique, and more particularly, to a technique for allocating sidelink resources in a communication system.

2. BACKGROUND

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, it may be required to allocate sidelink resources for transmission of data (e.g., V2X data). When a resource allocation mode that operates based on sensing of time and frequency resources is used, a resource reservation-based operation scheme may be required to reliably allocate resources for data transmission. In order to support the resource reservation-based operation scheme, a method of efficiently operating sidelink channels may be required.

SUMMARY

In one aspect, a method and an apparatus for allocating sidelink resources in a communication system is provided.

In one aspect, a method of a first user equipment (UE) may comprise: generating a first stage sidelink control information (SCI) including first resource allocation information and a first indicator indicating whether a second stage SCI includes second resource allocation information; transmitting the first stage SCI to a second UE on a physical sidelink control channel (PSCCH); and performing sidelink communication with the second UE by using a first resource region indicated by the first resource allocation information.

The method may further comprise, when the first indicator indicates that the second stage SCI includes the second resource allocation information, transmitting, to the second UE, the second stage SCI including the second resource allocation information on a physical sidelink shared channel (PSSCH), wherein a second resource region indicated by the second resource allocation information is different from the first resource region.

When the first indicator indicates that the second stage SCI does not include the second resource allocation information, transmission of the second stage SCI associated with the first stage SCI may be omitted.

The first stage SCI may further include a second indicator indicating a usage scheme of a sidelink channel, the second indicator set to a first value may indicate that the PSCCH is used for transmission of the first stage SCI and a PSSCH is used for transmission of the second stage SCI and data, and the second indicator set to a second value may indicate that the PSCCH is used for transmission of the first stage SCI and the PSSCH is used for transmission of the second stage SCI.

A usage scheme of a sidelink channel including the PSCCH and a PSSCH may be classified into a first scheme and a second scheme; when the first scheme is used, the PSCCH may be used for transmission of the first stage SCI, and the PSSCH may be used for transmission of the second stage SCI and data; when the second scheme is used, the PSCCH may be used for transmission of the first stage SCI, and the PSSCH may be used for transmission of the second stage SCI; and the first scheme may be used when a size of the data is less than or equal to a threshold value, and the second scheme may be used when the size of the data exceeds the threshold value.

The first resource allocation information may indicate resource regions of n SL channels, the second resource allocation information may indicate resource regions of k SL channels, each of the n SL channels and the k SL channels may include one PSCCH and one PSSCH belonging to the same resource block (RB) set, and each of n and k may be a natural number.

One of n, k, and (n+k) may be obtained from the base station through one or more of higher layer signaling, medium access control (MAC) signaling, or physical (PHY) signaling.

A sidelink channel including the PSCCH and the PSSCH may be transmitted in a monitoring occasion, the monitoring occasion may be configured for a specific cast type, and the specific cast type may be one of a unicast scheme, a groupcast scheme, or a broadcast scheme.

A method of a second UE, according to a second exemplary embodiment, may comprise: receiving a first stage sidelink control information (SCI) from a first UE on a physical sidelink control channel (PSCCH); identifying first resource allocation information and a first indicator indicating whether a second stage SCI includes second resource allocation information, the first resource allocation information and the first indicator being included in the first stage SCI; and when the first indicator indicates that the second stage SCI includes the second resource allocation information, performing a monitoring operation on a physical sidelink shared channel (PSSCH) to receive the second stage SCI from the second UE.

The first resource allocation information may indicate resource regions of n SL channels, the second resource allocation information may indicate resource regions of k SL channels, each of the n SL channels and the k SL channels may include one PSCCH and one PSSCH belonging to a same resource block (RB) set, and each of n and k may be a natural number.

One of n, k, and (n+k) may be obtained from the base station through one or more of higher layer signaling, medium access control (MAC) signaling, or physical (PHY) signaling.

A sidelink channel including the PSCCH and the PSSCH may be received in a monitoring occasion, the monitoring occasion may be configured for a specific cast type, and the specific cast type may be one of a unicast scheme, a groupcast scheme, or a broadcast scheme.

The first stage SCI may further include a second indicator indicating a usage scheme of a sidelink channel, the second indicator set to a first value may indicate that the PSCCH is used for transmission of the first stage SCI and the PSSCH is used for transmission of the second stage SCI and data, and the second indicator set to a second value may indicate that the PSCCH is used for transmission of the first stage SCI and the PSSCH is used for transmission of the second stage SCI.

A usage scheme of a sidelink channel including the PSCCH and a PSSCH may be classified into a first scheme and a second scheme; when the first scheme is used, the PSCCH may be used for transmission of the first stage SCI, and the PSSCH may be used for transmission of the second stage SCI and data; when the second scheme is used, the PSCCH may be used for transmission of the first stage SCI, and the PSSCH may be used for transmission of the second stage SCI; and the first scheme may be used when a size of the data is less than or equal to a threshold value, and the second scheme may be used when the size of the data exceeds the threshold value.

The threshold value may be obtained from the base station through one or more of higher layer signaling, MAC signaling, or PHY signaling.

A first UE, according to a third exemplary embodiment, may comprise: a processor; and a memory storing at least one instruction executable by the processor, wherein the at least one instruction may cause the first UE to: generate a first stage sidelink control information (SCI) including first resource allocation information and a first indicator indicating whether a second stage SCI includes second resource allocation information; transmit the first stage SCI to the second UE on a physical sidelink control channel (PSCCH); and perform sidelink communication with the second UE by using a first resource region indicated by the first resource allocation information.

When the first indicator indicates that the second stage SCI includes the second resource allocation information, the at least one instruction may further cause the first UE to transmit, to the second UE, the second stage SCI including the second resource allocation information on a physical sidelink shared channel (PSSCH), wherein a second resource region indicated by the second resource allocation information is different from the first resource region.

The first stage SCI further may include a second indicator indicating a usage scheme of a sidelink channel, the second indicator set to a first value may indicate that the PSCCH is used for transmission of the first stage SCI and a PSSCH is used for transmission of the second stage SCI and data, and the second indicator set to a second value may indicate that the PSCCH is used for transmission of the first stage SCI and the PSSCH is used for transmission of the second stage SCI.

The first resource allocation information may indicate resource regions of n SL channels, the second resource allocation information may indicate resource regions of k SL channels, each of the n SL channels and the k SL channels may include one PSCCH and one PSSCH belonging to a same resource block (RB) set, and each of n and k may be a natural number.

A sidelink channel including the PSCCH and the PSSCH may be transmitted in a monitoring occasion, the monitoring occasion may be configured for a specific cast type, and the specific cast type may be one of a unicast scheme, a groupcast scheme, or a broadcast scheme.

One or more the above steps may be carried out through use of a processor or control unit.

According to the present disclosure, sidelink resources may be allocated by a first stage SCI and/or second stage SCI, and sidelink communication may be performed using the allocated sidelink resource. In addition, the first stage SCI may include information element(s) for supporting allocation of the sidelink resources, and the sidelink resources can be efficiently allocated based on the information element(s) included in the first stage SCI. Accordingly, the performance of the communication system can be improved.

Other aspects are disclosed infra.

BRIEF DESCRIPTION OF THE DRAWINGS

FIG. 1 is a conceptual diagram illustrating V2X communication scenarios.

FIG. 2 is a conceptual diagram illustrating an exemplary embodiment of a cellular communication system.

FIG. 3 is a conceptual diagram illustrating an exemplary embodiment of a communication node constituting a cellular communication system.

FIG. 4 is a block diagram illustrating an exemplary embodiment of a user plane protocol stack of a UE performing sidelink communication.

FIG. 5 is a block diagram illustrating a first exemplary embodiment of a control plane protocol stack of a UE performing sidelink communication.

FIG. 6 is a block diagram illustrating a second exemplary embodiment of a control plane protocol stack of a UE performing sidelink communication.

FIG. 7 is a conceptual diagram illustrating a first exemplary embodiment of a method for allocating sidelink resources.

FIG. 8 is a conceptual diagram illustrating a second exemplary embodiment of a method for allocating sidelink resources.

FIG. 9 is a conceptual diagram illustrating a third exemplary embodiment of a method for allocating sidelink resources.

FIG. 10 is a sequence chart illustrating a first exemplary embodiment of a sidelink communication method.

FIG. 11 is a sequence chart illustrating a second exemplary embodiment of a sidelink communication method.

FIG. 12 is a sequence chart illustrating a third exemplary embodiment of a sidelink communication method.

FIG. 13 is a sequence chart illustrating a fourth exemplary embodiment of a sidelink communication method.

DETAILED DESCRIPTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for allocating sidelink resources will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. The signaling may refer to an operation in which a first communication node transmits information (e.g., control information, configuration information, information elements) to a second communication node. When the first communication node is a base station, the second communication node may be a transmitting terminal and/or a receiving terminal. When the first communication node is a terminal, the second communication node may be a base station. When the first communication node is a transmitting node, the second communication node may be a receiving node. When the first communication node is a receiving node, the second communication node may be a transmitting node. The transmitting terminal may be a terminal transmitting data, and the receiving terminal may be a terminal receiving the data.

A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

FIG. 7 is a conceptual diagram illustrating a first exemplary embodiment of a method for allocating sidelink resources.

As shown in FIG. 7, a resource pool may be configured for sidelink communication. The resource pool may be configured with one or more slots, one or more mini-slots, or one or more symbols in the time domain. The number of symbols constituting a mini-slot may be smaller than the number of symbols constituting a slot. The resource pool may comprise one or more resource block (RB) sets, one or more physical resource blocks (PRBs), or one or more subcarriers in the frequency domain. The RB set may be referred to as 'sub-channel'. One RB set may include one or more subcarriers or one or more PRBs. A single sub-channel may be a combination of a time resource region and a frequency resource region. A frequency resource region may be configured on a sub-channel basis, and one sub-channel may be used as a frequency resource region. In exemplary embodiments, a PRB may be interpreted as a common resource block (CRB) or a virtual resource block (VRB). The resource pool may be interpreted as logical resources. The resource pool may be non-contiguous time and frequency resources.

PSCCH(s) and PSSCH(s) may be allocated within the resource pool. A PSCCH and a PSSCH may belong to one RB set (i.e., the same RB set) in the frequency domain. The PSCCH and the PSSCH configured within one RB set (i.e., the same RB set) may be referred to as 'single-RB set channel'. Control information (e.g., SCI, first stage SCI) may be transmitted on a PSCCH (e.g., PSCCH candidate) within a PSCCH monitoring occasion (e.g., search space). The PSCCH monitoring occasion may be configured within one RB set.

An information element indicating whether a single-RB set channel is used may be transmitted by one or a combination of two or more of higher layer signaling, MAC signaling, and PHY signaling. For example, an information element set to a first value may indicate that a single-RB set channel is used. An information element set to a second value may indicate that a single-RB set channel is not used. In this case, the PSCCH and/or the PSSCH may be configured in a plurality of RB sets. Alternatively, the PSCCH and the PSSCH may be configured in different RB sets.

When the sidelink TM 2 is used, instead of the base station, the terminal may select a radio resource (e.g., time and/or frequency resource) by performing a sensing operation, and perform sidelink communication by using the selected radio resource. Transmission schemes of a single-RB set channel for initial transmission and/or retransmission resource allocation (e.g., resource reservation) of data may be defined as shown in Table 3 below.

TABLE 3

| | Description |
|---|---|
| Scheme #1 | A single-RB set channel (e.g., PSCCH and PSSCH) is transmitted, the PSCCH is used for transmission of a first stage SCI, and the PSSCH is used for transmission of a second stage SCI and data. |
| Scheme #2 | A single-RB set channel (e.g., PSCCH and PSSCH) is transmitted, the PSCCH is used for transmission of a first stage SCI, and the PSSCH is used for transmission of a second stage SCI. |
| Scheme #3 | A single-RB set channel (e.g., PSCCH and PSSCH) is transmitted, the PSCCH is used for transmission of a first stage SCI, and the PSSCH is used for transmission of a second stage SCI and data or transmission of a second stage SCI. |
| Scheme #4 | A single-RB set channel (e.g., PSCCH and PSSCH) is transmitted, the PSCCH is used for transmission of a first stage SCI, and the PSSCH is used for transmission of data. |

The scheme #3 may be a combination of the scheme #1 and the scheme #2. The terminal may use the scheme #1 or the scheme #2 as needed. In order to support the scheme(s) defined in Table 3, a single-RB set channel may be configured within a resource pool configured for each of the terminals (e.g., transmitting terminal and/or receiving terminal).

FIG. 8 is a conceptual diagram illustrating a second exemplary embodiment of a method for allocating sidelink resources.

As shown in FIG. 8, a single-RB set channel #1 may include a PSCCH #1 and a PSSCH #1 and may be configured within a single-RB set channel monitoring occasion. The single-RB set channel #1 may be used for allocation (e.g., reservation) of resources (e.g., PSCCH #2 resource and/or PSSCH #2 resource) for the next sidelink communication. The single-RB set channel monitoring occasion may be composed of one or more slots or one or more mini-slots in the time domain. The single-RB set channel monitoring occasion may be composed of one or more RB sets or one or more PRBs in the frequency domain. One or more single-RB set channels may be transmitted within the single-RB set channel monitoring occasion.

Configuration information of the single-RB set channel monitoring occasion may be transmitted through one or a combination of two or more of higher layer signaling, MAC signaling, and PHY signaling. The single-RB set channel monitoring occasion may be configured by one or a combination of two or more of resource pool-specific signaling, sidelink-specific signaling, and UE-specific signaling.

The single-RB set channel monitoring occasion may be configured for each resource pool as shown in Table 4 below. The configuration information (e.g., resource information) of the single-RB set channel monitoring occasion may be included in configuration information of the corresponding resource pool. Each of frequency regions #0 to #2 may indicate frequency domain resources of the single-RB set channel configured within the corresponding resource pool. Each of time regions #0 to #2 may indicate time domain resources of the single-RB set channel configured within the corresponding resource pool.

TABLE 4

| | Resource regions of a single-RB set channel monitoring occasion |
|---|---|
| Resource pool #1 | frequency region #0, time region #0 |
| Resource pool #2 | frequency region #1, time region #0 |
| Resource pool #3 | frequency region #2, time region #1 |
| Resource pool #4 | frequency region #0, time region #2 |

The frequency region defined in Table 4 may be a part or all of the frequency domain resources of the corresponding resource pool. The frequency region may include one or more subcarriers or one or more PRBs. The frequency region may indicate all or a start point (e.g., start PRB) of frequency domain resources of the corresponding single-RB set channel monitoring occasion. The information indicating the frequency region may be one or a combination of two or more of a start PRB index, an end PRB index, and the number of PRBs of the corresponding single-RB set channel monitoring occasion.

Each of the time regions #0 to #2 may be a part or all of the time domain resources of the corresponding resource pool. Each of the time regions #0 to #2 may include one or more symbols, one or more mini-slots, or one or more slots. The time region may indicate all or a start point (e.g., a start symbol, a start mini-slot, or a start slot) of the time domain resources of the corresponding single-RB set channel monitoring occasion. The information indicating the time region may be one or a combination of two or more of a start symbol index, an end symbol index, a start mini-slot index, an end mini-slot index, a start slot index, an end slot index, the number of symbols, the number of mini-slots, and the number of slots of the corresponding single-RB set channel monitoring occasion.

A cast type for the single-RB set channel monitoring occasion may be configured. The cast type may be classified into a broadcast scheme, a groupcast scheme, a multicast scheme, and a unicast scheme. For example, the single-RB set channel monitoring occasion to which specific cast types are applied may be defined as shown in Table 5 below.

TABLE 5

| | Resource regions of a single-RB set channel monitoring occasion |
|---|---|
| Broadcast | frequency region #0, time region #0 |
| Groupcast | frequency region #1, time region #0 |
| Unicast | frequency region #2, time region #1 |

The cast type applied to the single-RB set channel monitoring occasion may be determined according to characteristics of a transmission environment. The resource regions of the single-RB set channel monitoring occasion, which are configured for each cast type, may overlap. Alternatively, the resource regions of the single-RB set channel monitoring occasion, which are configured for each cast type, may be orthogonal. The cast type may be independently configured for each resource pool. That is, the cast type may be configured by resource pool-specific signaling. Alternatively, the cast type may be configured by sidelink-specific signaling within the resource pool.

The information defined in Table 4 and/or Table 5 may be configured by one or a combination of two or more of higher layer signaling, MAC signaling, and PHY signaling. The information defined in Table 4 may be configured to a transmitting terminal, and the transmitting terminal may inform a receiving terminal of the information defined in Table 4 by using MAC signaling and/or PHY signaling (e.g., PSCCH and/or PSSCH). In this case, the receiving terminal may expect to receive a single-RB set channel within a resource region indicated by the transmitting terminal.

Meanwhile, a single-RB set channel monitoring occasion may be configured based on Table 6 below instead of Tables 4 and 5. Configuration information of the single-RB set channel monitoring occasion defined in Table 6 may be transmitted through one or a combination of two or more of higher layer signaling, MAC signaling, and PHY signaling. For example, a table defined in Table 6 below may be preconfigured, and an information element indicating one single-RB set channel monitoring occasion may be transmitted. In this case, a resource pool, a resource region of a single-RB set channel monitoring occasion, and/or a cast type, which are associated with the corresponding information element, may be used.

TABLE 6

| single-RB set channel monitoring occasion | Resource pool | Resource regions of a single-RB set channel monitoring occasion within the resource pool | Cast type |
|---|---|---|---|
| #1 | #2 | frequency region #0, time region #0 | Broadcast |
| #2 | #4 | frequency region #1, time region #0 | Groupcast |
| #3 | #1 | frequency region #2, time region #1 | Groupcast |
| #4 | #1 | frequency region #0, time region #2 | Unicast |

FIG. 9 is a conceptual diagram illustrating a third exemplary embodiment of a method for allocating sidelink resources.

As shown in FIG. 9, a single-RB set channel monitoring occasion may be configured within a resource pool and may be divided into a plurality of resource regions. One or more resource regions may be configured by one resource pattern. Configuration information (e.g., index, time resource information, and/or frequency resource information) of resource patterns constituting the single-RB set channel monitoring occasion may be transmitted through one or a combination of two or more of higher layer signaling, MAC signaling, and PHY signaling.

For example, when one single-RB set channel monitoring occasion includes four resource patterns (e.g., resource patterns #1 to #4), an index of each of the four resource patterns may be defined as shown in Table 7 below. Indexes of one or more resource patterns used for transmission of a single-RB set channel, among the four resource patterns, may be transmitted through one or a combination of two or more of higher layer signaling, MAC signaling, and PHY signaling. The indexes of one or more resource patterns may be transmitted from the base station to the transmitting terminal and/or the receiving terminal. Alternatively, the indexes of one or more resource patterns may be transmitted from the transmitting terminal to the receiving terminal. In this case, the transmitting terminal may transmit the index (es) of the resource pattern(s) to the receiving terminal by using a PSCCH, PSSCH, and/or MAC CE. Accordingly, the receiving terminal may expect to receive a single-RB set channel in the resource pattern(s) indicated by the transmitting terminal (or base station).

TABLE 7

| | Indicator (e.g., index) |
|---|---|
| Resource pattern #1 | 00 |
| Resource pattern #2 | 01 |
| Resource pattern #3 | 10 |
| Resource pattern #4 | 11 |

Meanwhile, the single-RB set channel may be transmitted based on the scheme #1, scheme #2, scheme #3, or scheme #4 defined in Table 3. A first-stage SCI may include an information element indicating one or more SL resource regions. The maximum number of SL resource regions reservable (e.g., allocable) by one SCI scheduling transmission of one transport block (TB) may be preset. Alternatively, the maximum number of SL resource regions reservable by one SCI may be set by one or a combination of two or more of higher layer signaling, MAC signaling, and PHY signaling.

The maximum number of SL resource regions reservable by one SCI may be set by resource pool-specific signaling. In this case, the maximum number of SL resource regions may be set to a specific value for each resource pool. When resource pools are classified as shown in Table 8 below, the maximum number of SL resource regions may be set for each resource pool. Here, the resource pools #1 to #4 may have different sizes. For example, time resources and/or frequency resources constituting the resource pools #1 to #4 may be different from each other.

TABLE 8

| | The maximum number of SL resource regions reservable by one SCI |
|---|---|
| Resource pool #1 | 4 |
| Resource pool #2 | 3 |
| Resource pool #3 | 2 |
| Resource pool #4 | 1 |

When the scheme #1 is used, a first stage SCI may include resource information for transmission and reception of a second stage SCI, resource information for transmission and reception of data (e.g., sidelink data), and/or information for decoding of a second stage SCI, and the second stage SCI may include information for decoding the data. When the scheme #2 is used, a first stage SCI may include resource information for transmission/reception of a second stage SCI and/or information for decoding the second stage SCI. In the scheme #2, since data is not transmitted on a PSSCH where the second stage SCI is located, the first stage SCI may not include resource information for transmission/reception of data, and the second stage SCI may not include information for decoding the data.

SL resource regions may be defined as shown in Table 9 below. A transmission resource for a SL channel #0 may include a frequency region #0 and a time region #0, a transmission resource for a SL channel #1 may include a frequency region #1 and a time region #1, and a transmission resource for a SL channel #2 may include a frequency region #2 and a time region #2.

TABLE 9

| | SL resource region |
|---|---|
| SL #0 (=PSCCH#0 + PSSCH#0) | Frequency resource #0, Time resource #0 |

TABLE 9-continued

| | SL resource region |
|---|---|
| SL #1 (=PSCCH#1 + PSSCH#1) | Frequency resource #1, Time resource #1 |
| SL #2 (=PSCCH#2 + PSSCH#2) | Frequency resource #2, Time resource #2 |

When the number of SL resource regions (e.g., SL channels) reservable by one SCI is 3, the first stage SCI (e.g., a payload of the first stage SCI) may include information elements indicating time and frequency regions defined in Table 9. The SL channel #0 may be a single-RB set channel. The first stage SCI transmitted on the PSCCH #0 may include resource information (e.g., frequency region #0 and time region #0) of the second stage SCI and data transmitted on the PSSCH #0. A combination of the frequency region #0 and the time region #0 may indicate a specific resource region.

In addition, a combination of the frequency region #1 and the time region #1 associated with the SL channel #1 may indicate a specific resource region, and a combination of the frequency region #2 and the time region #2 associated with the SL channel #2 may indicate a specific resource region. Here, a frequency resource may be indicated by a subcarrier index, the number of subcarriers, a PRB index, the number of PRBs, an RB set index, the number of RB sets, a resource element (RE) index, and/or the number of REs. A time resource may be indicated by a symbol index, the number of symbols, a mini-slot index, the number of mini-slots, a slot index, the number of slots, a subframe index, the number of subframes, an RE index, and/or the number of REs. The entire resource region may be indicated by a combination of the above-described parameters.

For example, a time region may be indicated by a start symbol index and an end symbol index. Alternatively, the time region may be indicated by the start symbol index and the number of symbols constituting the time region. When a time region is allocated in units of slots, the time region may be indicated by a start slot index and an end slot index. Alternatively, the time region may be indicated by the start slot index and the number of slots constituting the time region.

A frequency region may be indicated by a start subcarrier index and an end subcarrier index. Alternatively, the frequency region may be indicated by the start subcarrier index and the number of subcarriers constituting the frequency region. When a frequency region is allocated in units of PRBs, the frequency region may be indicated by a start PRB index and an end PRB index. Alternatively, the frequency region may be indicated by the start PRB index and the number of PRBs constituting the frequency region. When a frequency region is allocated in units of RB sets, the frequency region may be indicated by a start RB set index and an end RB set index. Alternatively, the frequency region may be indicated by the start RB set index and the number of RB sets constituting the frequency region. Each of the time region and the frequency region may be indicated using various schemes other than the above-described schemes.

When the SL channel #1 and/or SL channel #2 defined in Table 9 are used for retransmission, the SL channel #1 and/or SL channel #2 may be located after the SL channel #0. In this case, the time region #1 of the SL channel #1 may be indicated by the time region #0 indicated by the SL channel #0 and a time offset. In addition, the time region #2 of the SL channel #2 may be indicated by the time region #0 indicated by the SL channel #0 and a time offset. For example, the SL channel #1 may be located i slots after an end time (or start time) of the time region #0. In addition, the SL channel #2 may be located after p slots from an end time (or start time) of the time region #0 or the time region #1. That is, each of i and p may be a time offset. Each of i and p may be a natural number. The time offset may be set by one or a combination of two or more of higher layer signaling, MAC signaling, and PHY signaling.

FIG. 10 is a sequence chart illustrating a first exemplary embodiment of a sidelink communication method.

As shown in FIG. 10, sidelink communication between a transmitting terminal and a receiving terminal may be performed. The transmitting terminal may be the UE 235 shown in FIG. 2, and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Communication between the transmitting terminal and the receiving terminal may be performed using a single-RB set channel. The transmitting terminal may generate a first stage SCI (S1001). The first stage SCI may include resource region information of the SL channel #0, resource region information of the SL channel #1, and resource region information of the SL channel #2 defined in Table 9. Also, the first stage SCI may include an allocation indicator. The allocation indicator set to a first value (e.g., 0) may indicate that a second stage SCI associated with the first stage SCI does not include resource region information (e.g., resource allocation information or resource reservation information). That is, the allocation indicator set to the first value may indicate that resource region information of all SL channels is included in the first stage SCI.

The allocation indicator set to a second value (e.g., 1) may indicate that the second stage SCI associated with the first stage SCI includes resource region information (e.g., resource allocation information or resource reservation information). That is, the allocation indicator set to the second value may indicate that resource region information of SL channels other than the SL channel (e.g., SL channel #0) on which the first stage SCI including the allocation indicator is transmitted is included in the second stage SCI. When the allocation indicator is set to the second value, the receiving terminal may decode up to the second stage SCI for resource sensing. The first stage SCI generated in the step S1001 may not include the allocation indicator. In this case (i.e., when the first stage SCI received from the transmitting terminal does not include the allocation indicator), the receiving terminal may perform a monitoring operation for obtaining the second stage SCI. Alternatively, the first stage SCI generated in the step S1001 may include the allocation indicator set to the first value.

The transmitting terminal may transmit the first stage SCI on a PSCCH #0 (e.g., PSCCH #0 belonging to the SL channel #0) (S1002). The receiving terminal may receive the first stage SCI from the transmitting terminal by performing a monitoring operation on the PSCCH #0 (e.g., single-RB set channel monitoring occasion). The receiving terminal may identify the resource region information of the SL channel #0, the resource region information of the SL channel #1, and the resource region information of the SL channel #2 included in the first stage SCI (S1003). Sidelink communication between the transmitting terminal and the receiving terminal may be performed using the resource region(s) indicated by the first stage SCI (S1004). The performing of the sidelink communication in the step S1004 may mean performing of an operation required for data transmission/reception and/or a data transmission/reception operation.

FIG. 11 is a sequence chart illustrating a second exemplary embodiment of a sidelink communication method.

As shown in FIG. 11, sidelink communication between a transmitting terminal and a receiving terminal may be performed. The transmitting terminal may be the UE 235 shown in FIG. 2, and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Communication between the transmitting terminal and the receiving terminal may be performed using a single-RB set channel. The transmitting terminal may generate a first stage SCI (S1101). The first stage SCI may include resource allocation information (e.g., resource region information) and an allocation indicator. The first stage SCI may include resource region information of a SL channel #0 to which a PSCCH #0 on which the first stage SCI is transmitted belongs. The allocation indicator may indicate that a second stage SCI associated with the first stage SCI includes resource allocation information. That is, the allocation indicator may be set to the second value.

The transmitting terminal may transmit the first stage SCI on a PSCCH #0 (e.g., PSCCH #0 belonging to the SL channel #0) (S1102). The receiving terminal may receive the first stage SCI from the transmitting terminal by performing a monitoring operation on the PSCCH #0 (e.g., single-RB set channel monitoring occasion). The receiving terminal may identify resource region information of the SL channel #0 and the allocation indicator included in the first stage SCI (S1103). When the allocation indicator is set to the second value, the receiving terminal may determine that the second stage SCI associated with the first stage SCI includes resource region information of the remaining SL channel(s) excluding the SL channel #0.

Meanwhile, the transmitting terminal may generate the second stage SCI including resource region information of a SL channel #1 and resource region information of a SL channel #2 (S1104). The transmitting terminal may transmit the second stage SCI on a PSSCH #0 (e.g., PSSCH #0 belonging to the SL channel #0) (S1105). The receiving terminal may receive the second stage SCI from the transmitting terminal by performing a monitoring operation on the PSSCH #0 (e.g., single-RB set channel monitoring occasion). The receiving terminal may identify the resource region information of the SL channel #1 and the resource region information of the SL channel #2 included in the second stage SCI (S1106). Sidelink communication between the transmitting terminal and the receiving terminal may be performed using the resource region(s) indicated by the first stage SCI and/or the second stage SCI (S1107). The performing of the sidelink communication in the step S1107 may mean performing of an operation required for data transmission/reception and/or a data transmission/reception operation.

FIG. 12 is a sequence chart illustrating a third exemplary embodiment of a sidelink communication method.

As shown in FIG. 12, sidelink communication between a transmitting terminal and a receiving terminal may be performed. The transmitting terminal may be the UE 235 shown in FIG. 2, and the receiving terminal may be the UE 236 shown in FIG. 2. Each of the transmitting terminal and the receiving terminal may be configured identically or similarly to the communication node 300 shown in FIG. 3. Each of the transmitting terminal and the receiving terminal may support the protocol stacks shown in FIGS. 4 to 6.

Communication between the transmitting terminal and the receiving terminal may be performed using a single-RB set channel. The transmitting terminal may generate a first stage SCI (S1201). The first stage SCI may include resource region information of n SL channel(s). Then SL channel(s) may include a SL channel (e.g., SL channel #0) to which a PSCCH on which the first stage SCI is transmitted, and (n−1) SL channel(s) located after the SL channel #0.

In the time domain, a SL channel #1 may be positioned after the SL channel #0, a SL channel #2 may be positioned after the SL channel #1, and a SL channel #3 may be positioned after the SL channel #2. The SL channel #1 may be the earliest SL channel in the time domain among the SL channels positioned after the SL channel #0, the SL channel #2 may be the earliest SL channel in the time domain among the SL channels positioned after the SL channel #1, and the SL channel #3 may be the earliest SL channel in the time domain among the SL channels positioned after the SL channel #2.

When n is 2, the first stage SCI may include resource region information of the SL channel #0 and resource region information of the SL channel #1. When n is 3, the first stage SCI may include resource region information of the SL channel #0, resource region information of the SL channel #1, and resource region information of the SL channel #2. n may be set by one or a combination of two or more of higher layer signaling, MAC signaling, and PHY signaling.

In the exemplary embodiment shown in FIG. 12, it is assumed that n is 2. The transmitting terminal may transmit the first stage SCI including resource region information of the SL channel #0 and resource region information of the SL channel #1 on a PSCCH #0 (e.g., PSCCH #0 belonging to the SL channel #0) (S1202). The receiving terminal may receive the first stage SCI from the transmitting terminal by performing a monitoring operation on the PSCCH #0 (e.g., single-RB set channel monitoring occasion). The receiving terminal may identify the resource region information of the SL channel #0 and the resource region information of the SL channel #1 included in the first stage SCI (S1203).

Meanwhile, the transmitting terminal may generate the second stage SCI including resource region information of the remaining SL channels (e.g., SL channel #2) (S1204). The transmitting terminal may transmit the second stage SCI on a PSSCH #0 (e.g., PSSCH #0 belonging to SL channel #0) (S1205). The maximum number (hereinafter, referred to as 'm') of SL channels allocable (e.g., reservable) by the SCI (e.g., the first stage SCI and the second stage SCI) may be preset. m may be set by one or a combination of two or more of higher layer signaling, MAC signaling, and PHY signaling. In this case, the second stage SCI may include resource region information of (m-n) SL channel(s). (m-n) may be set by one or a combination of two or more of higher layer signaling, MAC signaling, and PHY signaling.

The receiving terminal may receive the second stage SCI from the transmitting terminal by performing a monitoring operation on the PSSCH #0 (e.g., single-RB set channel monitoring occasion). The receiving terminal may identify the resource region information of the SL channel #2 included in the second stage SCI (S1206). Sidelink communication between the transmitting terminal and the receiving terminal may be performed using the resource region(s) indicated by the first stage SCI and/or the second stage SCI (S1207). The performing of the sidelink communication in the step S1207 may mean performing of an operation required for data transmission/reception and/or a data transmission/reception operation.

Meanwhile, after the step S1206 shown in FIG. 12, the transmitting terminal may reserve an additional resource to perform sidelink communication using the SL channel #1. The reservation procedure of the additional resource may be performed as shown in FIG. 13 below.

FIG. 13 is a sequence chart illustrating a fourth exemplary embodiment of a sidelink communication method.

As shown in FIG. 13, when n is 2, a transmitting terminal may generate a first stage SCI including resource region information of a SL channel #1 and resource region information of a SL channel #2 (S1301). The transmitting terminal may transmit the first stage SCI on a PSCCH #1 (e.g., PSCCH #1 belonging to the SL channel #1) (S1302). The receiving terminal may receive the first stage SCI from the transmitting terminal by performing a monitoring operation on the PSCCH #1 (e.g., single-RB set channel monitoring occasion). The receiving terminal may identify the resource region information of the SL channel #1 and the resource region information of the SL channel #2 included in the first stage SCI (S1303).

The transmitting terminal may generate a second stage SCI including resource region information of the remaining SL channels (e.g., SL channel #3) (S1304). The transmitting terminal may transmit the second stage SCI on a PSSCH #1 (e.g., PSSCH #1 belonging to the SL channel #1) (S1305). When m is 3, the second stage SCI may include resource region information of one SL channel (i.e., 3−2=1).

The receiving terminal may receive the second stage SCI from the transmitting terminal by performing a monitoring operation on the PSSCH #1 (e.g., single-RB set channel monitoring occasion). The receiving terminal may identify resource region information of a SL channel #3 included in the second stage SCI (S1306). Sidelink communication between the transmitting terminal and the receiving terminal may be performed using the resource region(s) indicated by the first stage SCI and/or the second stage SCI (S1307).

On the other hand, when the exemplary embodiment(s) shown in FIG. 12 and/or 13 are used, resources (e.g., resource regions) may be reserved one by one according to a chain rule based on the first stage SCI. The receiving terminal may identify resource allocation information (e.g., resource reservation information) by receiving successive first stage SCIs without the second-stage SCI. When wanting to know information of resource regions of all allocated (e.g., reserved) SL channels, the receiving terminal may obtain the corresponding resource information by decoding not only the first stage SCI but also the second stage SCI. In the exemplary embodiment(s) shown in FIG. 12 and/or 13, each of n and m may be set to various values. The first stage SCI may further include an allocation indicator as well as the resource region information of the SL channel(s). The allocation indicator may indicate whether the second stage SCI includes resource region information of the SL channel(s).

Meanwhile, when the scheme #3 defined in Table 3 is used, the scheme #1 or scheme #2 may be selected according to a situation. For example, when the size of data to be transmitted is small (e.g., when the size of data is less than or equal to a threshold value), the scheme #1 may be used. In this case, the data may be transmitted through a single-RB set channel. When the size of data to be transmitted is large (e.g., when the size of data exceeds a threshold value), the scheme #2 may be used. In this case, a single-RB set channel may be used for reserving a transmission resource of data, and the data may be transmitted through the reserved resource.

Here, the threshold value may be X bytes. The threshold (e.g., X) may be set by one or a combination of two or more of higher layer signaling, MAC signaling, and PHY signaling. The first stage SCI may include a scheme indicator indicating a scheme to be used. The scheme indicator may indicate the scheme #1 or scheme #2 defined in Table 3. As another example, the scheme indicator may indicate the scheme #1, scheme #2, or scheme #3 defined in Table 3. As another example, the scheme indicator may indicate the scheme #1, scheme #2, scheme #3, or scheme #4 defined in Table 3. In order to express the scheme indicator, a field (e.g., a field providing other information) included in the first stage SCI may be reused. The scheme indicator may be explicitly or implicitly indicated by the first stage SCI.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of a first user equipment (UE), comprising:
generating a first stage sidelink control information (SCI) including first resource allocation information and a first indicator indicating whether a second stage SCI includes second resource allocation information;
transmitting the first stage SCI to a second UE on a physical sidelink control channel (PSCCH); and
performing first sidelink communication with the second UE by using a first resource region indicated by the first resource allocation information,
wherein the second resource allocation information included in the second stage SCI indicates a second resource region, and the second resource region is used for second sidelink communication.

2. The method according to claim 1, further comprising, when the first indicator indicates that the second stage SCI includes the second resource allocation information, transmitting, to the second UE, the second stage SCI including the second resource allocation information on a physical sidelink shared channel (PSSCH), wherein the second resource region indicated by the second resource allocation information is different from the first resource region.

3. The method according to claim 1, wherein when the first indicator indicates that the second stage SCI does not include the second resource allocation information, transmission of the second stage SCI associated with the first stage SCI is omitted.

4. The method according to claim 1, wherein the first stage SCI further includes a second indicator indicating a usage scheme of a sidelink channel, the second indicator set to a first value indicates that the PSCCH is used for transmission of the first stage SCI and a PSSCH is used for transmission of the second stage SCI and data, and the second indicator set to a second value indicates that the PSCCH is used for transmission of the first stage SCI and the PSSCH is used for transmission of the second stage SCI.

5. The method according to claim 1, wherein:
a usage scheme of a sidelink channel including the PSCCH and a PSSCH is classified into a first scheme and a second scheme;
when the first scheme is used, the PSCCH is used for transmission of the first stage SCI, and the PSSCH is used for transmission of the second stage SCI and data;
when the second scheme is used, the PSCCH is used for transmission of the first stage SCI, and the PSSCH is used for transmission of the second stage SCI; and
the first scheme is used when a size of the data is less than or equal to a threshold value, and the second scheme is used when the size of the data exceeds the threshold value.

6. The method according to claim 1, wherein the first resource allocation information indicates resource regions of n SL channels, the second resource allocation information indicates resource regions of k SL channels, each of the n SL channels and the k SL channels includes one PSCCH and one PSSCH belonging to a same resource block (RB) set, and each of n and k is a natural number.

7. The method according to claim 6, wherein one of n, k, and (n+k) is obtained from the base station through one or more of higher layer signaling, medium access control (MAC) signaling, or physical (PHY) signaling.

8. The method according to claim 1, wherein a sidelink channel including the PSCCH and a PSSCH is transmitted in a monitoring occasion, the monitoring occasion is configured for a specific cast type, and the specific cast type is one of a unicast scheme, a groupcast scheme, or a broadcast scheme.

9. A method of a second user equipment (UE), comprising:
receiving a first stage sidelink control information (SCI) from a first UE on a physical sidelink control channel (PSCCH);
identifying first resource allocation information and a first indicator indicating whether a second stage SCI includes second resource allocation information, the first resource allocation information and the first indicator being included in the first stage SCI; and
when the first indicator indicates that the second stage SCI includes the second resource allocation information, performing a monitoring operation on a physical sidelink shared channel (PSSCH) to receive the second stage SCI from the second UE,
wherein the first resource allocation information included in the first stage SCI indicates a first resource region, the first resource region is used for first sidelink communication, the second resource allocation information included in the second stage SCI indicates a second resource region, and the second resource region is used for second sidelink communication.

10. The method according to claim 9, wherein the first resource allocation information indicates resource regions of n SL channels, the second resource allocation information indicates resource regions of k SL channels, each of the n SL channels and the k SL channels includes one PSCCH and one PSSCH belonging to a same resource block (RB) set, and each of n and k is a natural number.

11. The method according to claim 10, wherein one of n, k, and (n+k) is obtained from the base station through one or more of higher layer signaling, medium access control (MAC) signaling, or physical (PHY) signaling.

12. The method according to claim 9, wherein a sidelink channel including the PSCCH and the PSSCH is received in a monitoring occasion, the monitoring occasion is configured for a specific cast type, and the specific cast type is one of a unicast scheme, a groupcast scheme, or a broadcast scheme.

13. The method according to claim 9, wherein the first stage SCI further includes a second indicator indicating a usage scheme of a sidelink channel, the second indicator set to a first value indicates that the PSCCH is used for transmission of the first stage SCI and the PSSCH is used for transmission of the second stage SCI and data, and the second indicator set to a second value indicates that the PSCCH is used for transmission of the first stage SCI and the PSSCH is used for transmission of the second stage SCI.

14. The method according to claim 9, wherein:
a usage scheme of a sidelink channel including the PSCCH and the PSSCH is classified into a first scheme and a second scheme;
when the first scheme is used, the PSCCH is used for transmission of the first stage SCI, and the PSSCH is used for transmission of the second stage SCI and data;
when the second scheme is used, the PSCCH is used for transmission of the first stage SCI, and the PSSCH is used for transmission of the second stage SCI; and
the first scheme is used when a size of the data is less than or equal to a threshold value, and the second scheme is used when the size of the data exceeds the threshold value.

15. The method according to claim 14, wherein the threshold value is obtained from the base station through one or more of higher layer signaling, MAC signaling, or PHY signaling.

16. A first user equipment (UE), comprising:
a processor; and
a memory storing at least one instruction executable by the processor, wherein the at least one instruction causes the first UE to:
generate a first stage sidelink control information (SCI) including first resource allocation information and a first indicator indicating whether a second stage SCI includes second resource allocation information;
transmit the first stage SCI to the second UE on a physical sidelink control channel (PSCCH); and
perform first sidelink communication with the second UE by using a first resource region indicated by the first resource allocation information,
wherein the second resource allocation information included in the second stage SCI indicates a second resource region, and the second resource region is used for second sidelink communication.

17. The first UE according to claim 16, wherein when the first indicator indicates that the second stage SCI includes the second resource allocation information, the at least one instruction further causes the first UE to transmit, to the second UE, the second stage SCI including the second resource allocation information on a physical sidelink shared channel (PSSCH), wherein the second resource region indicated by the second resource allocation information is different from the first resource region.

18. The first UE according to claim 16, wherein the first stage SCI further includes a second indicator indicating a usage scheme of a sidelink channel, the second indicator set to a first value indicates that the PSCCH is used for transmission of the first stage SCI and a PSSCH is used for transmission of the second stage SCI and data, and the second indicator set to a second value indicates that the PSCCH is used for transmission of the first stage SCI and the PSSCH is used for transmission of the second stage SCI.

19. The first UE according to claim 16, wherein the first resource allocation information indicates resource regions of n SL channels, the second resource allocation information indicates resource regions of k SL channels, each of the n SL channels and the k SL channels includes one PSCCH and one PSSCH belonging to a same resource block (RB) set, and each of n and k is a natural number.

20. The first UE according to claim 16, wherein a sidelink channel including the PSCCH and a PSSCH is transmitted in a monitoring occasion, the monitoring occasion is configured for a specific cast type, and the specific cast type is one of a unicast scheme, a groupcast scheme, or a broadcast scheme.

* * * * *